United States Patent [19]
Sanders

[11] Patent Number: 5,843,548
[45] Date of Patent: Dec. 1, 1998

[54] STRUCTURE FOR PROTECTING INDIVIDUALS FROM SOLAR ULTRAVIOLET RADIATION

[75] Inventor: Ronald H. Sanders, Great Neck, N.Y.

[73] Assignee: Polymer Innovations Corporation, Great Neck, N.Y.

[21] Appl. No.: 648,887

[22] Filed: May 16, 1996

Related U.S. Application Data

[63] Continuation-in-part of Ser. No. 622,624, Mar. 27, 1996, abandoned.

[51] Int. Cl.$^6$ ..................................................... B32B 27/18
[52] U.S. Cl. ................................ 428/40.1; 52/73; 52/74; 135/87; 135/88.01; 135/88.07; 135/88.09; 135/908; 428/40.4; 428/41.3; 428/41.5; 428/41.7; 428/41.8; 428/213; 428/412; 428/480; 428/483; 428/918
[58] Field of Search ..................... 428/40.1, 40.4, 428/41.3, 41.5, 41.7, 41.8, 480, 231, 412, 483, 918; 52/73, 74; 135/87, 88.01, 88.07, 88.09, 908

[56] References Cited

U.S. PATENT DOCUMENTS

| | | | |
|---|---|---|---|
| 4,046,933 | 9/1977 | Stefanik | 428/81 |
| 4,446,262 | 5/1984 | Okumura et al. | 524/89 |
| 4,540,622 | 9/1985 | Brunion et al. | 428/216 |
| 5,281,469 | 1/1994 | Baiocchi | 428/216 |
| 5,480,926 | 1/1996 | Fagerburg et al. | 524/86 |
| 5,558,912 | 9/1996 | Fagerburg | 428/35.7 |

FOREIGN PATENT DOCUMENTS

| | | |
|---|---|---|
| 0 569 878 | 11/1993 | European Pat. Off. . |
| 5-297510 | 11/1993 | Japan . |
| 61-61022 | 6/1994 | Japan . |
| 7-9560 | 1/1995 | Japan . |

OTHER PUBLICATIONS

Anonymous, "Polyester And Copolyester Sheeting, Film And Structured Products Stabilized Against Degradation By Sunlight Or Other UV Light Sources," *Research Disclosure*, vol. 367, No. 8 (Emsworth, Great Britain, Nov. 10, 1994).

Primary Examiner—Nasser Ahmad
Attorney, Agent, or Firm—Fish & Neave; Jeffrey H. Ingerman

[57] ABSTRACT

A self-supporting structure protects individuals from solar ultraviolet radiation without obstructing their views. The structure is formed from a substantially transparent substrate to which is applied an ultraviolet radiation absorbing material. A photochromic component can also be added to the substrate. The structure can be used as a golf cart or marine vessel canopy, as a building awning or canopy, as a window blind, or for any other application where a substantially transparent self-supporting structure that absorbs ultraviolet radiation is needed.

71 Claims, 6 Drawing Sheets

STRUCTURE FOR PROTECTING INDIVIDUALS FROM SOLAR ULTRAVIOLET RADIATION

CROSS REFERENCE TO RELATED APPLICATION

This is a continuation-in-part of commonly-assigned U.S. patent application Ser. No. 08/622,624, filed Mar. 27, 1996, now abandoned.

BACKGROUND OF THE INVENTION

This invention relates to a structure for protecting individuals from solar ultraviolet radiation. More particularly, this invention relates to a structure which allows full visibility for the individuals while blocking solar ultraviolet radiation. Most particularly, this invention relates to such a structure for use outdoors, especially in mobile applications.

The dangers of excessive exposure to solar ultraviolet radiation have become of increasing concern, as the effects of such exposure on human health have become better known, and as stratospheric ozone depletion has increased ground-level ultraviolet intensity. Indeed, many conservative medical practitioners have recommended decreasing time spent outdoors in order to minimize one's exposure to ultraviolet radiation.

Such recommendations are difficult to heed. Some individuals have occupations that require that they be outdoors, such as, inter alia, sidewalk vendors and doormen. In addition, there are many individuals who enjoy engaging in outdoor athletic activities such as golf, in which there is prolonged exposure to solar ultraviolet radiation.

It is known to provide awnings or similar structures to shield such individuals from sunlight. For example, a sidewalk vendor may have an opaque umbrella on his or her stand, and a doorman may have an canopy to stand under. A golfer using a riding golf cart can have an opaque canopy on the cart. Such structures have the disadvantage, however, of blocking all components of the sunlight, rather than just ultraviolet light, whereas the individual may prefer to have the visible components of the sunlight. In the case of golf cart users, in particular, they may find the decreased visibility caused by an opaque top to be a disadvantage. Tinted transparent structures have less effect on visibility, but tinting generally does not have any substantial effect on ultraviolet radiation.

Similarly, it is known to add layers of material to window glass to prevent the transmission of various components of sunlight to the interior of a building. However, such materials also affect the transmission of visible light, and they deteriorate after a time, developing holes and discolorations. Opaque window blinds would block ultraviolet light, but again suffer the disadvantage of also blocking other components of sunlight.

It is also known to provide containers made from various polymeric materials having additives that block the transmission of ultraviolet radiation, thus shielding the contents of the container. However, such materials have not heretofore been capable of being self-supporting, as would be needed for a structure that could be erected to shield living individuals, including canopies, awnings, and window blinds.

It would be desirable to be able to provide a self-supporting structure that is capable of blocking the transmission of ultraviolet light without blocking other components of visible light, and that has increased survivability in outdoor conditions.

SUMMARY OF THE INVENTION

It is an object of this invention to provide a self-supporting structure that is capable of blocking the transmission of ultraviolet light without blocking other components of visible light, and that has increased survivability in outdoor conditions.

In accordance with the present invention, there is provided a structure for protecting an individual from ultraviolet radiation of the sun without impairment of the individual's vision by the structure. The structure includes a substantially transparent polymeric substrate having a first side and a second side opposite the first side. The substrate is supported with the first side facing the sun. A material is borne by the polymeric substrate, the material being substantially opaque to ultraviolet radiation and substantially transparent to other forms of light. When an individual is adjacent the second side of the substrate, the individual is protected from ultraviolet radiation without impairment of the individual's vision by the structure.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
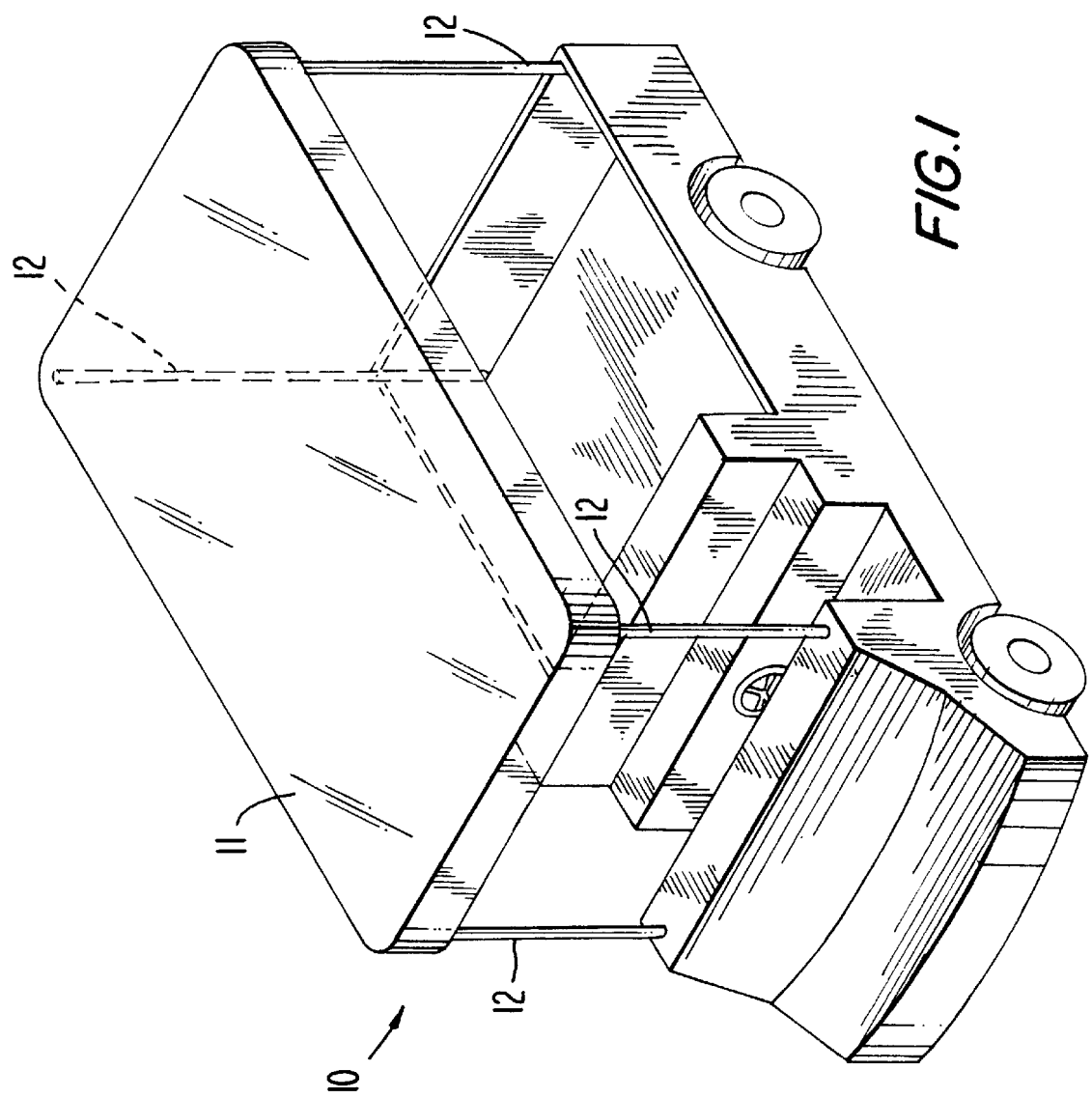
FIG. 1 is a perspective view of a golf cart having a canopy according to a preferred embodiment of the present invention.

The present invention provides shielding outdoors for individuals against solar ultraviolet radiation without intruding on their field of view. This is accomplished by using a substantially transparent polymeric substrate material to which has been added an additive that absorbs and blocks ultraviolet radiation and also helps prevent the substrate material from breaking down under the action of the ultraviolet radiation.

The substrate material is preferably a self-supporting substantially transparent polymeric material such as polyethylene terephthalate-glycol (PET-G) in sheet form, having a thickness between about 0.095 inch and about 0.125 inch (between about 0.24 cm and about 0.318 cm), preferably about 0.125 inch (about 0.318 cm).

PET-G is a particularly preferred substrate material for several reasons. First, it is as strong as a greater thickness of polycarbonate. Second, it is amorphous and does not crystallize, so it does not warp, nor does it turn milky with age. Third, if scratched, it is "self-healing" with the application of heat, such as with a hand-held hair dryer. Fourth, it is easily formed by conventional injection molding or thermal forming techniques, as is well known. For example, preferred processing conditions for thermal forming of PET-G sheet include a PET-G sheet temperature of about 280° F. (about 138° C.) using a tool or mold at a temperature between about 140° F. and about 160° F. (between about 60° C. and about 71° C.). However, other polyesters can also be used within the scope of this invention, as can polycarbonate, polyethylene, or a methacrylate plastic.

The additive, which can be a single compound or a "system" of compounds, is preferably a material that not only blocks ultraviolet radiation, but also stabilizes the substrate material and also serves as a scavenger to protect and improve upon the characteristics of the substrate, by removing various free radicals. One family of light stabilizing additives that is particularly useful with polyester substrates (such as PET-G) is the family of additives available under the trademark CYASORB® from the Polymer Additives Department of Cytec Industries, Inc., of Stamford, Conn. Of these, a particularly preferred additive, which is sold under the name CYASORB® UV-3638 Light Absorber, is $C_{22}H_{12}N_2O_4$, a benzoxazinone whose full chemical name is $2,2^1$-(1,4-phenylene)bis[4H-3,1-benzoxazin-4-one]. However, other ultraviolet radiation absorbing materials may be used, such as other benzoxazinones, as well as benzophenones, benzotriazoles and hindered amine light stabilizers.

The ultraviolet absorbing additive may be compounded into the plastic substrate, applied to the surface of the substrate, or impregnated in a thin sheet of a flexible plastic, such as a polyester sold under the trademark MYLAR® by E. I. du Pont de Nemours and Company, Inc. The flexible sheet can then be affixed to the substantially transparent rigid substrate. For example, the sheet may be affixed to the substrate by an adhesive layer. If there is such an adhesive layer, the additive can be in the adhesive, or it can be impregnated into the sheet itself. The sheet preferably has a thickness between about 0.002 inch and about 0.005 inch (between about 0.051 mm and about 0.127 mm), and most preferably about 0.004 inch (about 0.102 mm). Alternatively, the adhesive impregnated with the additive can be used by itself as a coating on the surface of the substrate.

Having the additive in a separate sheet, removable from the substrate, may be advantageous because the ultraviolet radiation blocking effects of the additive may not be permanent; it may break down with time. The expected lifetime of the rigid substrate, such as a substrate of PET-G, may be much greater. Using a separate sheet allows the additive to be changed without the need to change, as often, a more expensive and potentially unwieldy part of the structure.

As a further feature of the invention, a photochromic material or component can be added to the structure. In one embodiment, the substrate could be a laminate of two or more sheets or laminae, with the photochromic material located between the laminae. The laminae could be joined solely by applying heat, pressure or both. Alternatively, an adhesive layer could be provided between the laminae, which would reduce the amount of heat or pressure required to join them. If an adhesive is used, the photochromic material could be mixed or otherwise compounded into the adhesive.

In another embodiment, instead of applying the photochromic material between two laminae of the substrate, the photochromic material could be applied as a coating—e.g., by spraying, or otherwise—to one of the two sides of the substrate.

Although the expected lifetime of the photochromic material alone is not substantially greater than that of the ultraviolet radiation absorbing material, it is expected that addition of the photochromic material will prolong the life of structures according to the invention by a factor of about 10. Also, the addition of a photochromic material will enhance the aesthetic qualities of structures according to the invention.

Particularly preferred photochromic materials for use with the invention are those belonging to the family of photochromic dyes available from PPG Industries, Inc., of Pittsburgh, Pa., under the name PHOTOSOL®. These photochromic dyes are either oxazines or naphthopyrans.

The structure of the present invention can take several forms, as will be apparent from FIGS. 1–7.

In a first preferred embodiment of the invention shown in FIG. 1, a golf cart 10 is equipped with a canopy 11 according to the invention. Golf cart 10 is otherwise conventional, and canopy 11 is supported in a conventional manner, such as by poles 12. Canopy 11 is preferably made from PET-G, for the reasons discussed above, which is impregnated with the ultraviolet radiation absorbing material described above, which preferably is the benzoxazinone material sold as CYASORB® UV-3638 as discussed above. However, also as discussed above, the other substantially transparent polymeric materials, and other ultraviolet radiation absorbing materials, can be used.

As set forth above, canopy 11 is preferably substantially transparent, thereby offering users of golf cart 10 an unobstructed view of their surroundings, including other golfers, etc. At the same time, canopy 11 shields the users from solar ultraviolet radiation, and the presence of the ultraviolet radiation absorbing material preferably prevents, or at least slows, degradation of canopy 11 itself as a result of exposure to ultraviolet radiation. Canopy 11 can be tinted if desired for aesthetic reasons, or for user comfort on very bright days.

Figure 5:
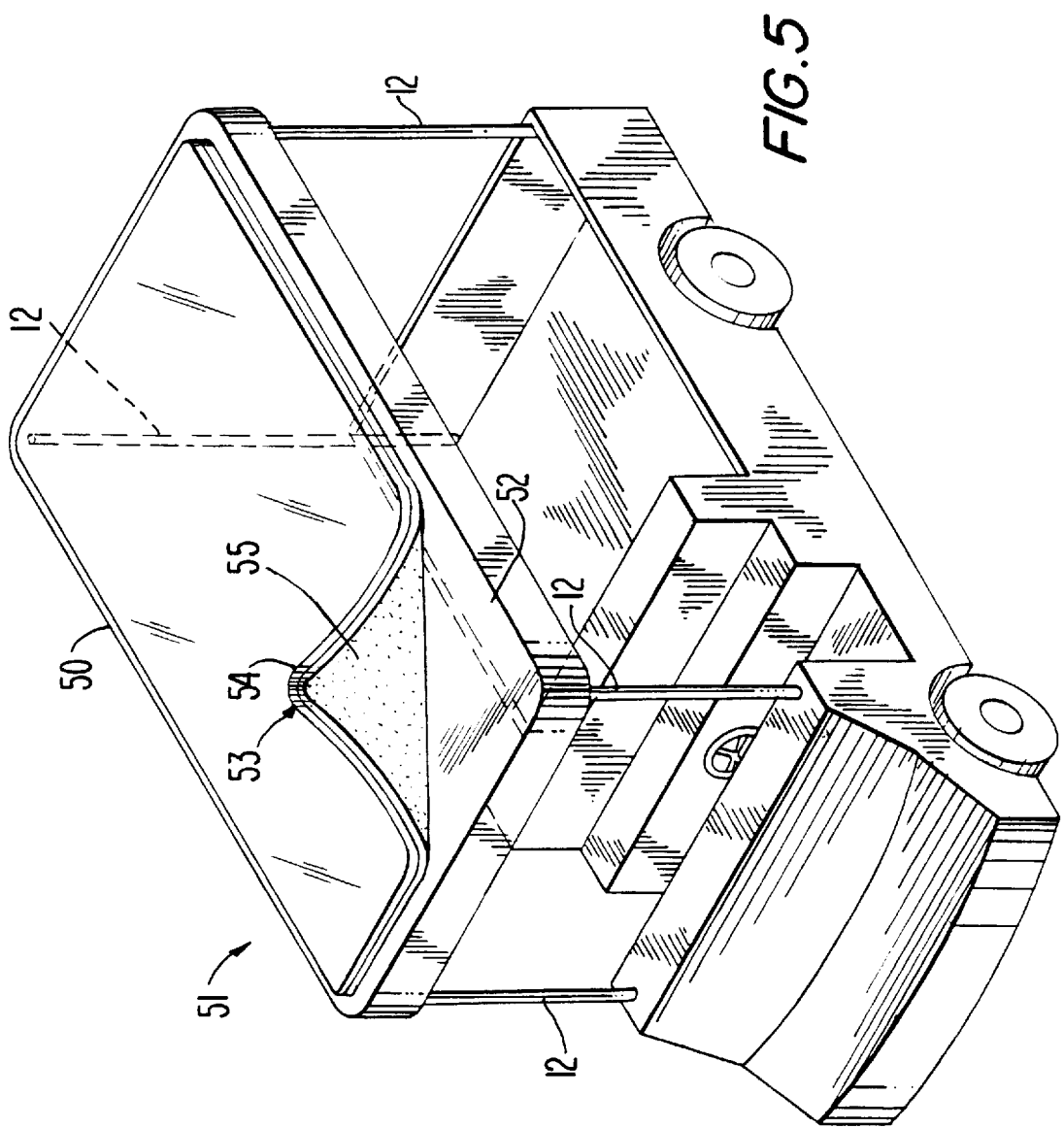
FIG. 5 is a perspective view of a golf cart having a canopy according to a second preferred embodiment of the present invention.

A second preferred embodiment of a golf cart canopy 51 is shown on golf cart 50 of FIG. 5. As described above, canopy 51 includes a formed substrate 52 (of PET-G or one of the other materials discussed above), to which is applied a film 53 bearing the ultraviolet radiation absorbing material, which is preferably the same as that described in connection with the first embodiment.

As discussed above, film 53 preferably has a polymeric layer 54 which is preferably made of a polyester such as that sold under the trademark MYLAR® by E. I. du Pont de Nemours and Company, Inc., preferably having a thickness between about 0.002 inch and about 0.005 inch (between about 0.051 mm and about 0.127 mm), and most preferably about 0.004 inch (about 0.102 mm). The film may be printed with, e.g., the logo of the golf club or country club that owns golf cart 51. Preferably, film 53 also has an adhesive layer 55 which facilitates its attachment to substrate 52, but any suitable conventional form of attachment may be used, including, e.g., electrostatic attraction. If an adhesive layer 55 is used, it may be preferable to impregnate adhesive layer 55, rather than polymeric layer 54, with the ultraviolet radiation absorbing material.

Whatever form of attachment is used, it is preferably easily removable. This allows easy replacement of film 53 when it has degraded, which is likely to occur before substrate 52 itself has degraded to the point of requiring replacement. In addition, easy removal and replacement of film 53 allows a golf club to personalize its golf carts. For example, if an important tournament is being played, the name of the tournament and the logo of the sponsor could be printed on films 53 and applied to the carts used for the tournament. Those films 53 could later be replaced with films bearing the club's own logo, or that of another event.

Polymeric layer 54 is preferably, in any event, substantially transparent, even with any printing that may be applied. Adhesive layer 55, if present, also is preferably transparent. Thus, maximum visibility for users is maintained. As discussed above, tints can be applied for user comfort; in this embodiment, the tint could be applied either to the replaceable film 53, or to the permanent substrate 52.

Alternatively, if the adhesive layer 55 is impregnated with the ultraviolet radiation absorbing material, adhesive layer 55 may be used alone (not shown) as an ultraviolet radiation absorbing coating. Again, the coating could be tinted or clear.

Figure 2:
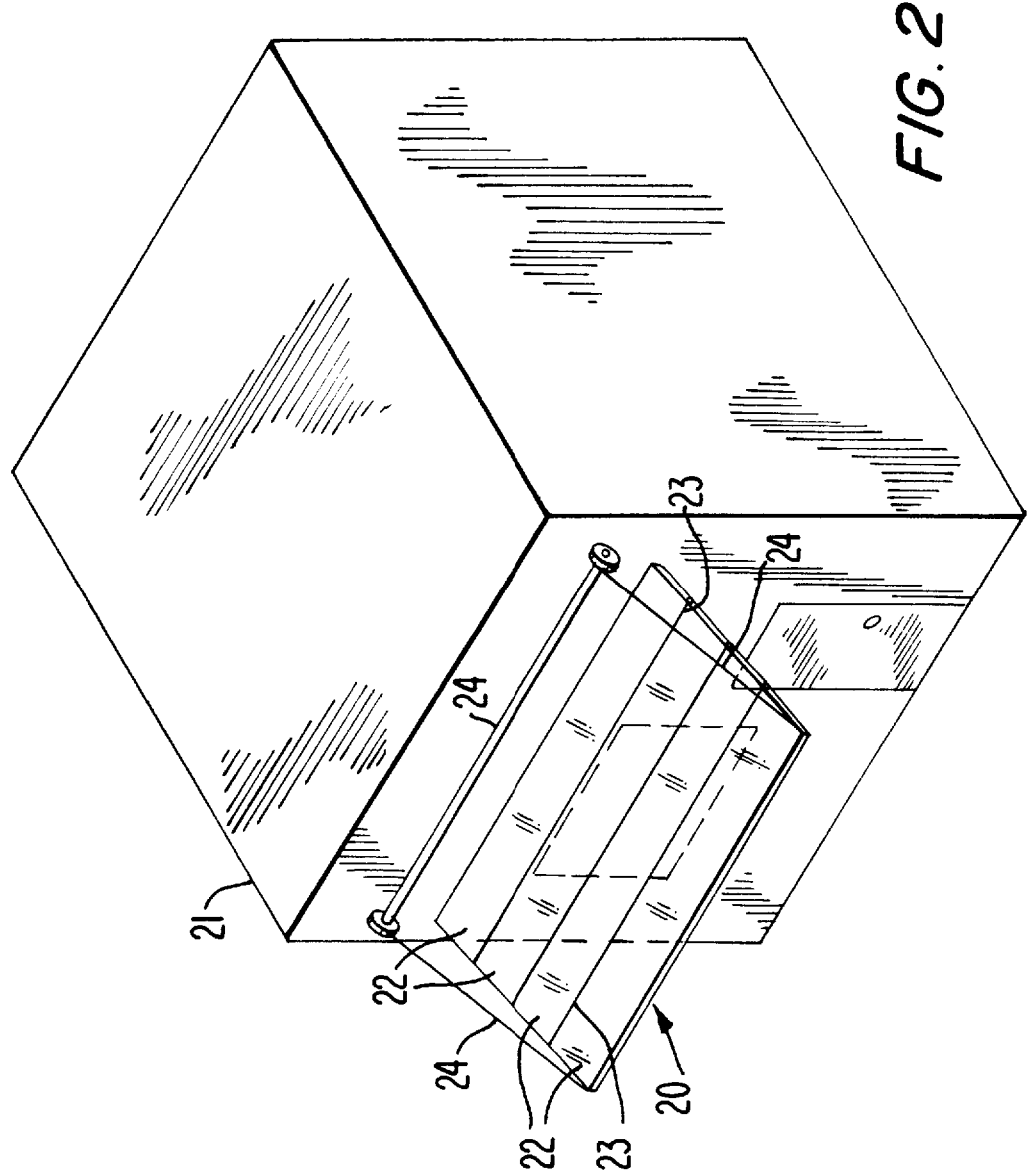
FIG. 2 is a perspective view of a building having an awning according to the present invention.
Figure 3:
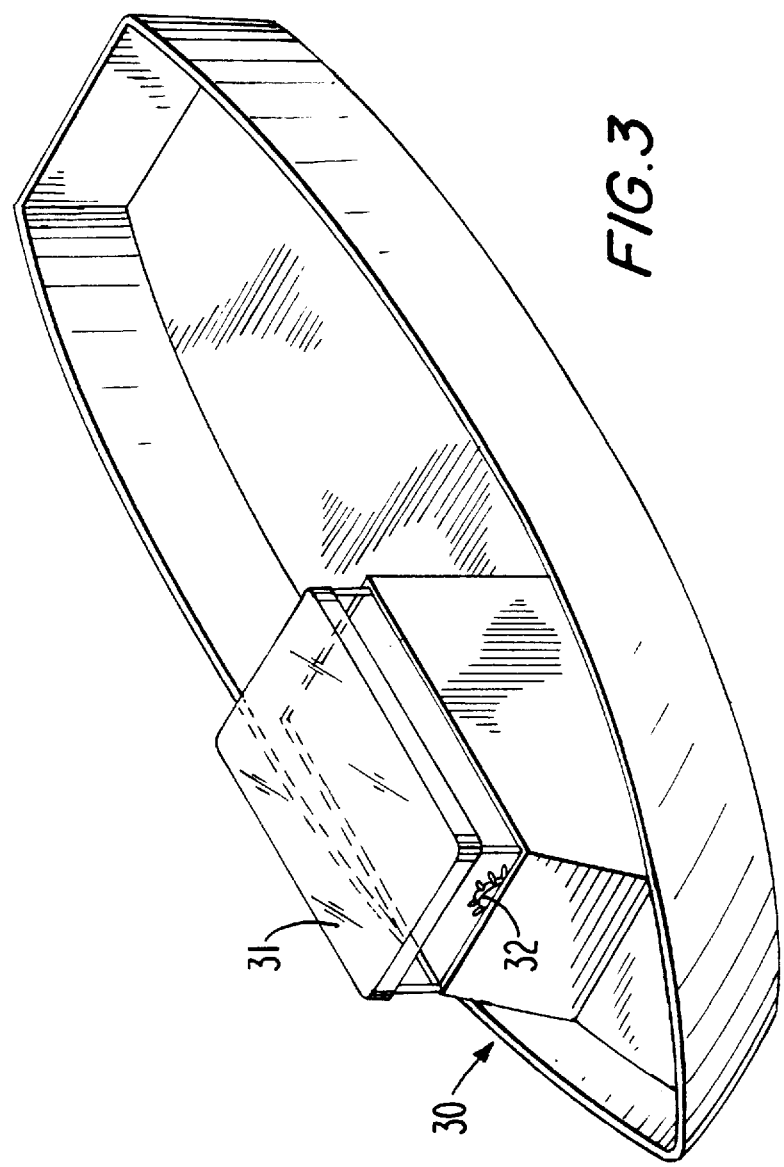
FIG. 3 is a perspective view of a boat having a canopy according to the present invention.
Figure 4:
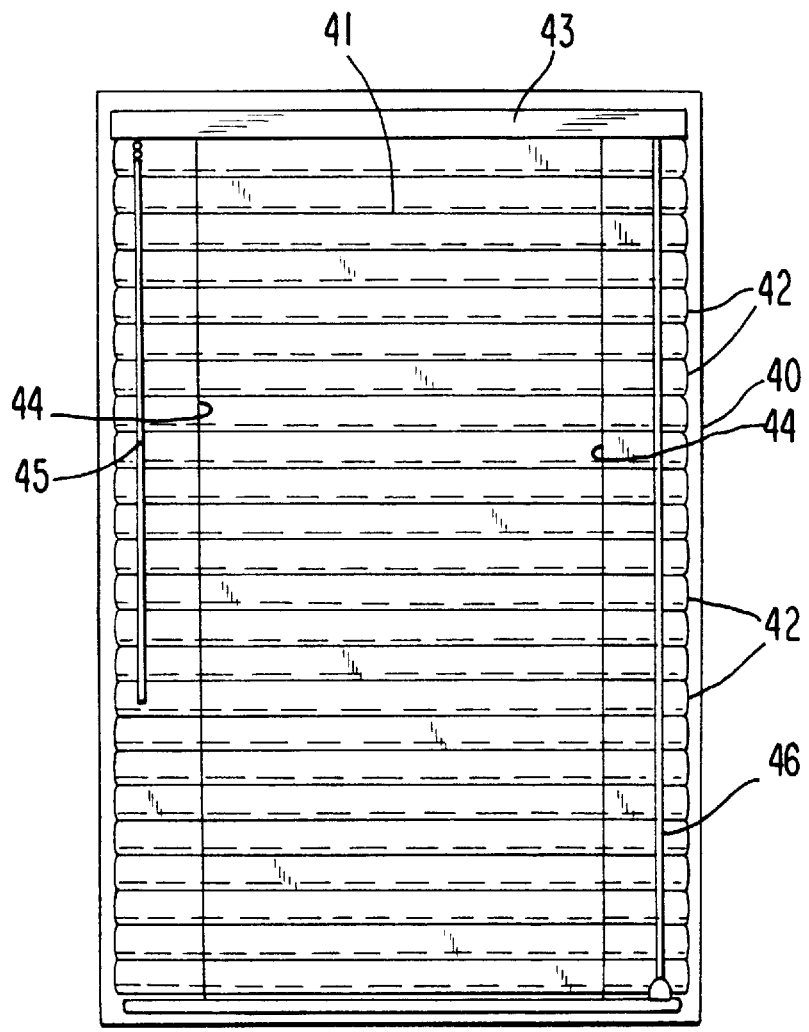
FIG. 4 is a perspective view of a window blind according to the present invention.

Other structures according to the invention include an awning 20 as shown in FIG. 2. Awning 20, attached to building 21, is preferably made of materials similar to those used for canopies 11, 50, and preferably is formed in panels 22, which may be hinged (not shown) at joints 23. Panels 22 preferably are similar in construction and composition to canopies 11, 50, or they may be flexible, and in any event they are supported by a suitable frame or cable structure 24, which preferably allows retraction of the awning 20. Awning 20 thus shields occupants of building 21, and those standing in front of it, such as the doorman, from ultraviolet radiation without casting shadows or obstructing views. A fixed canopy (not shown) according to the invention may also be attached to building 21 for these purposes if desired.

Similarly, a canopy 31, substantially similar to canopies 11, 50, can be supplied on a cabin cruiser or similar vessel 30, or in other marine applications, to protect the operator of the vessel, standing at wheel 32, from ultraviolet radiation,. without obstructing his or her view as he or she pilots vessel 30.

Finally, as another example of an application of the present invention, occupants of a building can be shielded from ultraviolet radiation that may enter through a window 40 by a window blind 41 according to this invention. Blind 41 preferably has slats 42 that are substantially transparent, yet block ultraviolet light in the manner described above, being similar in construction and composition to canopies 11, 31, 50 or awning panels 22. Slats 42 may be tinted as discussed above, for occupant comfort, as well as for decorative purposes. Blind 41 preferably is otherwise conventional, with slats 42 preferably suspended from header 43 by ladder tapes 44. A rod 45 preferably is provided to change the inclination of slats 42, which are substantially vertical in FIG. 4, while a pull cord 46 preferably is provided to raise and lower blind 41.

Figure 6:
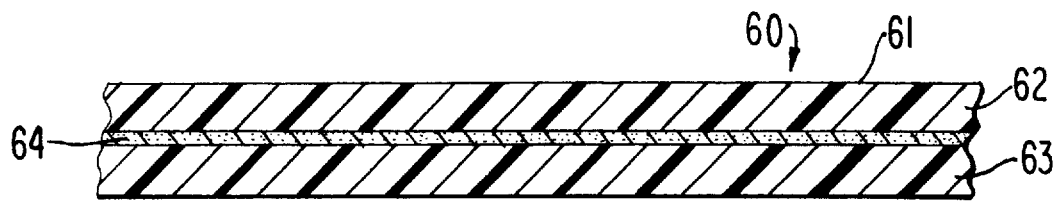
FIG. 6 is a fragmentary cross-sectional view of a structure according to a third preferred embodiment of the present invention.

FIG. 6 shows a fragmentary cross-sectional view of a substrate 61 of a structure according to another preferred embodiment 60 of the present invention, which can be used with any of the types of structures described above. In this embodiment, substrate 61 is a laminate of two laminae 62, 63. For example, each of laminae 62, 63 may be a sheet of PET-G as described above, having a thickness between about 0.050 inch and about 0.060 inch (between about 1.27 mm and about 1.52 mm), with a layer 64 of photochromic material, such as one of the PHOTOSOL® materials referred to above, sandwiched between them. Laminae 62, 63 can be fastened together with heat, pressure or both, or layer 64 may also include an adhesive with which the photochromic material is mixed or compounded, which would reduce the amount of heat and pressure required to fasten laminae 62, 63. Layer 64 could also include the ultraviolet absorbing additive discussed above. Alternatively, that additive can be compounded directly into one or both laminae 62, 63, or can be applied using one or both of polymeric layer 54 and adhesive layer 55 (not shown in FIG. 6) as discussed above.

Figure 7:
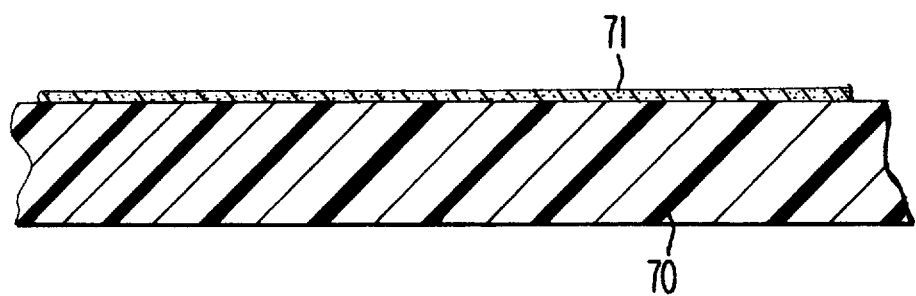
FIG. 7 is a fragmentary cross-sectional view of a structure according to a fourth preferred embodiment of the present invention.

As an alternative, as shown in FIG. 7, photochromic material could be applied as a coating 71 to one of the top and bottom sides (top side shown) of substrate 70. As above, coating 71 could be made of the photochromic material mixed with an adhesive.

Use of a photochromic material such as that described in connection with FIGS. 6 and 7, could serve as replacement for the tinting described above for aesthetic or user comfort purposes, or could supplement such tinting.

Only a small number of the different types of structures according to the invention for protecting individuals from ultraviolet radiation without obstructing their views, or their enjoyment of their surroundings, have been illustrated. Any number of other types of structures may be provided within the bounds of the present invention.

Thus it is seen that a self-supporting structure that is capable of blocking the transmission of ultraviolet light without blocking other components of visible light, and that has increased survivability in outdoor conditions, has been provided. One skilled in the art will appreciate that the present invention can be practiced by other than the described embodiments, which are presented for purposes of illustration and not of limitation, and the present invention is limited only by the claims which follow.

What is claimed is:

1. A structure for protecting an individual at a location from ultraviolet radiation of the sun without impairment of said individual's vision by said structure, said structure comprising:

a substantially transparent, rigid, self-supporting polymeric substrate having a first side and a second side opposite said first side, said substrate being supported with said first side facing the sun;

a material borne by said polymeric substrate, said material being substantially opaque to ultraviolet radiation and substantially transparent to radiation other than ultraviolet radiation; and means for suspending said substrate between said location and the sun; whereby:

when said individual is at said location, adjacent said second side of said substrate, said individual is protected from ultraviolet radiation without impairment of said individual's vision by said structure.

2. The structure of claim 1 wherein said rigid polymeric substrate is injection molded into a desired shape.

3. The structure of claim 1 wherein said rigid polymeric substrate is thermally formed into a desired shape.

4. The structure of claim 1 wherein said rigid polymeric substrate has a thickness between about 0.095 inch and about 0.125 inch (between about 0.24 cm and about 0.318 cm).

5. The structure of claim 4 wherein said thickness is about 0.125 inch (about 0.318 cm).

6. The structure of claim 1 wherein said rigid polymeric substrate comprises a polyester.

7. The structure of claim 1 wherein said rigid polymeric substrate comprises polycarbonate.

8. The structure of claim 1 wherein said rigid polymeric substrate comprises polyethylene.

9. The structure of claim 1 wherein said rigid polymeric substrate comprises a methacrylate plastic.

10. The structure of claim 1 wherein said material is compounded into said polymeric substrate.

11. The structure of claim 10 wherein said material comprises a benzoxazinone.

12. The structure of claim 11 wherein said material comprises 2,2$^1$-(1,4-phenylene)bis[4H-3,1-benzoxazin-4-one].

13. The structure of claim 1 further comprising a coating applied to a surface of said substrate, said material being integral with said coating.

14. The structure of claim 1 further comprising a polymeric film applied to a surface of said substrate, said material being integral with said polymeric film.

15. The structure of claim 14 wherein said polymeric film comprises a polymeric layer.

16. The structure of claim 15 wherein said polymeric layer comprises a polyester.

17. The structure of claim 14 wherein said material is compounded into said polymeric layer.

18. The structure of claim 14 wherein said polymeric film has a thickness between about 0.002 inch and about 0.005 inch (between about 0.051 mm and about 0.127 mm).

19. The structure of claim 18 wherein said polymeric film has a thickness of about 0.004 inch (about 0.102 mm).

20. The structure of claim 18 wherein said material comprises a benzoxazinone.

21. The structure of claim 20 wherein said material comprises 2,2$^1$-(1,4-phenylene)bis[4H-3,1-benzoxazin-4-one].

22. The structure of claim 14 wherein said polymeric film has an adhesive layer applied thereto, said polymeric film being applied to said substrate by said adhesive layer.

23. The structure of claim 22 wherein said adhesive layer is releasable, said polymeric film thereby being removable from said substrate.

24. The structure of claim 22 wherein said material is in said adhesive layer.

25. The structure of claim 1 wherein said material comprises a benzoxazinone.

26. The structure of claim 25 wherein said material comprises 2,2$^1$-(1,4-phenylene)bis[4H-3,1-benzoxazin-4-one].

27. The structure of claim 1 further comprising a coating applied to one of said first and second sides of said substrate, said material being in said coating.

28. The structure of claim 1 further comprising a photochromic component.

29. The structure of claim 28 wherein said photochromic component is a naphthopyran.

30. The structure of claim 28 wherein said photochromic component is an oxazine.

31. The structure of claim 28 wherein:
said polymeric substrate is a laminate; and
said photochromic component is between laminae of said laminate.

32. The structure of claim 31 further comprising an adhesive layer between said laminae, wherein said photochromic component is in said adhesive layer.

33. The structure of claim 28 wherein said photochromic component is a coating on one of said first and second sides of said polymeric substrate.

34. The structure of claim 1, wherein said structure is a window blind.

35. The structure of claim 1, wherein said structure is an awning.

36. The structure of claim 1, wherein said structure is a canopy.

37. The structure of claim 36 wherein said canopy is a marine canopy.

38. The structure of claim 36 wherein said canopy is a golf cart canopy.

39. A golf cart canopy for protecting an individual in a golf cart from ultraviolet radiation of the sun without impairment of said individual's vision, said golf cart canopy comprising:

a substantially transparent, rigid, self-supporting polymeric substrate having a first side and a second side opposite said first side, said substrate being supported with said first side facing upward;

a material borne by said polymeric substrate, said material being substantially opaque to ultraviolet radiation and substantially transparent to radiation other than ultraviolet radiation; and means for suspending said substrate above said golf cart; whereby:

when said individual in said golf cart under said canopy adjacent said second side of said substrate, said individual is protected from ultraviolet radiation without impairment of said individual's vision by said canopy.

40. The golf cart canopy of claim 39 wherein said rigid polymeric substrate is injection molded into a desired shape.

41. The golf cart canopy of claim 39 wherein said rigid polymeric substrate is thermally formed into a desired shape.

42. The golf cart canopy of claim 39 wherein said rigid polymeric substrate has a thickness between about 0.095 inch and about 0.125 inch (between about 0.24 cm and about 0.318 cm).

43. The golf cart canopy of claim 42 wherein said thickness is about 0.125 inch (about 0.318 cm).

44. The golf cart canopy of claim 39 wherein said rigid polymeric substrate comprises a polyester.

45. The golf cart canopy of claim 39 wherein said rigid polymeric substrate comprises polycarbonate.

46. The golf cart canopy of claim 39 wherein said rigid polymeric substrate comprises polyethylene.

47. The golf cart canopy of claim 39 wherein said rigid polymeric substrate comprises a methacrylate plastic.

48. The golf cart canopy of claim 39 wherein said material is compounded into said polymeric substrate.

49. The golf cart canopy of claim 48 wherein said material comprises a benzoxazinone.

50. The golf cart canopy of claim 49 wherein said material comprises 2,2$^1$-(1,4-phenylene)bis[4H-3,1-benzoxazin-4-one].

51. The golf cart canopy of claim 39 further comprising a coating applied to a surface of said substrate, said material being integral with said coating.

52. The golf cart canopy of claim 39 further comprising a polymeric film applied to a surface of said substrate, said material being integral with said polymeric film.

53. The golf cart canopy of claim 52 wherein said polymeric film comprises a polymeric layer.

54. The golf cart canopy of claim 53 wherein said polymeric layer comprises a polyester.

55. The golf cart canopy of claim 52 wherein said material is compounded into said polymeric layer.

56. The golf cart canopy of claim 52 wherein said polymeric film has a thickness between about 0.002 inch and about 0.005 inch (between about 0.051 mm and about 0.127 mm).

57. The golf cart canopy of claim 56 wherein said polymeric film has a thickness of about 0.004 inch (about 0.102 mm).

58. The golf cart canopy of claim 52 wherein said material comprises a benzoxazinone.

59. The golf cart canopy of claim 58 wherein said material comprises 2,2$^1$-(1,4-phenylene)bis[4H-3,1-benzoxazin-4-one].

60. The golf cart canopy of claim 52 wherein said polymeric film has an adhesive layer applied thereto, said polymeric film being applied to said substrate by said adhesive layer.

61. The golf cart canopy of claim 60 wherein said adhesive layer is releasable, said polymeric film thereby being removable from said substrate.

62. The golf cart canopy of claim 60 wherein said material is in said adhesive layer.

63. The golf cart canopy of claim 39 wherein said material comprises a benzoxazinone.

64. The golf cart canopy of claim 63 wherein said material comprises 2,2$^1$-(1,4-phenylene)bis[4H-3,1-benzoxazin-4-one].

65. The golf cart canopy of claim 39 further comprising a coating applied to one of said first and second sides of said substrate, said material being in said coating.

66. The golf cart canopy of claim 39 further comprising a photochromic component.

67. The golf cart canopy of claim 66 wherein said photochromic component is a naphthopyran.

68. The golf cart canopy of claim 66 wherein said photochromic component is an oxazine.

69. The golf cart canopy of claim 66 wherein:

said polymeric substrate is a laminate; and said photochromic component is between laminae of said laminate.

70. The golf cart canopy of claim 69 further comprising an adhesive layer between said laminae, wherein said photochromic component is in said adhesive layer.

71. The golf cart canopy of claim 66 wherein said photochromic component is a coating on one of said first and second sides of said polymeric substrate.

* * * * *